Feb. 27, 1923.
W. A. BERNARD
HAND TOOL
Filed Nov. 29, 1918
1,446,540
2 sheets-sheet 1
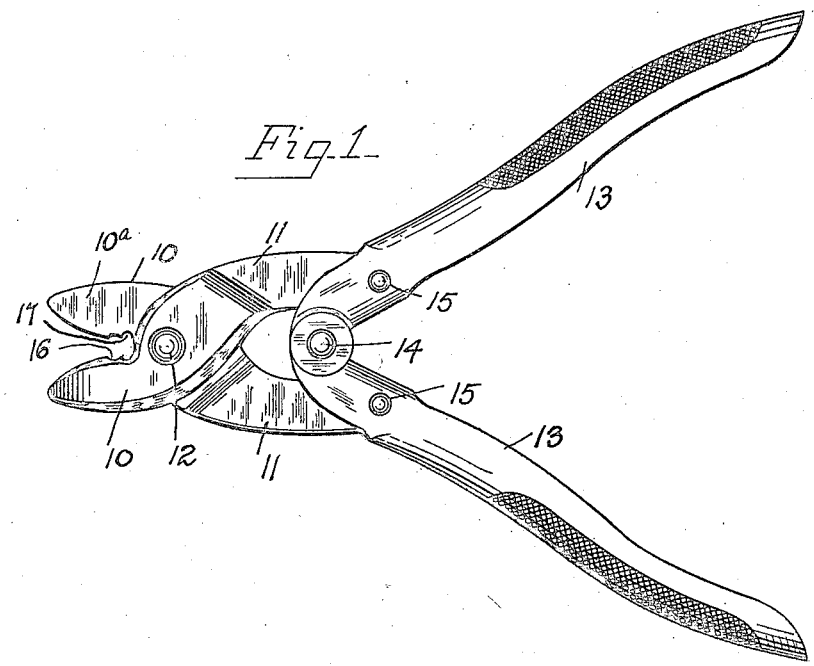
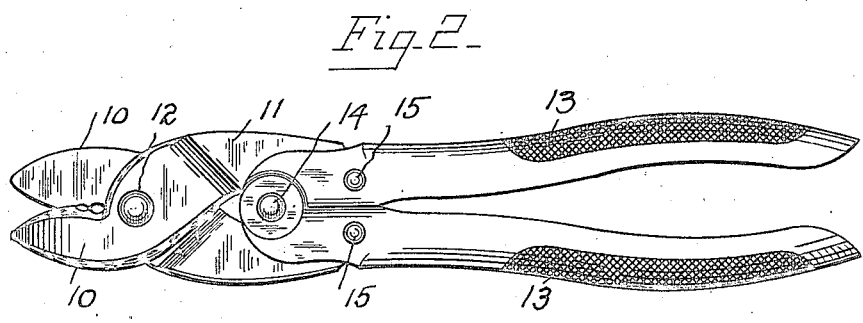
Inventor
William A. Bernard
By
Attorney Feb. 27, 1923.
W. A. BERNARD
HAND TOOL
Filed Nov. 29, 1918
1,446,540
2 sheets-sheet 2
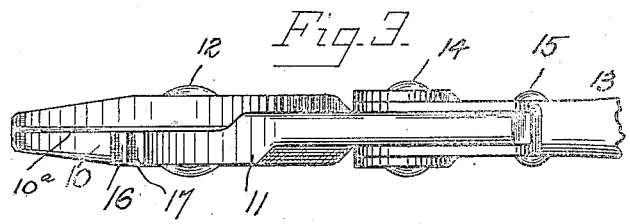
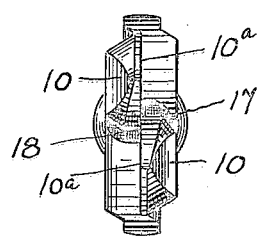
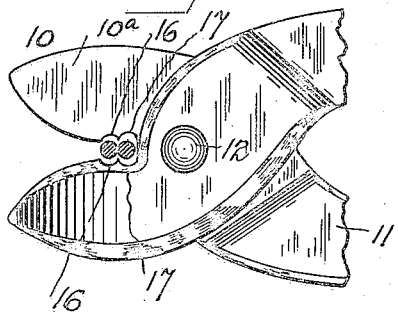
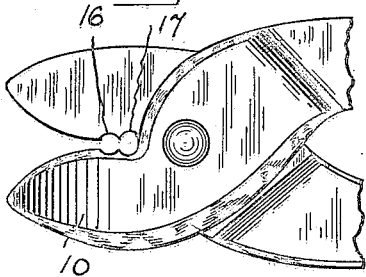
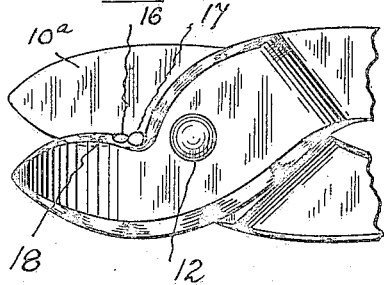
Inventor
William A. Bernard,
By
Attorney Patented Feb. 27, 1923.

1,446,540

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

HAND TOOL.

Application filed November 29, 1918. Serial No. 264,312.

*To all whom it may concern:*

Be it known that I, WILLIAM A. BERNARD, a citizen of the United States, residing in New Haven, county of New Haven, State of Connecticut, have invented certain new and useful Improvements in Hand Tools, of which the following is a full, clear, and exact description.

This invention relates to a hand tool of the plier or lever handle type, and it has particular reference to a wire cutter.

The primary object of the invention is to furnish a powerful and efficient, compact and readily portable tool for cutting hard steel wire of the kind in which two or more strands lie parallel to each other and are suitably fastened together. The particular tool selected for illustration is intended to cut wire of great hardness and toughness, which is of the duplex or two-strand type, the two strands lying in contact with each other throughout their length and being fastened together by solder or the like.

In cutting wire of this character, by means of a tool having pivoted or so-called alligator jaws, considerable difficulty has been encountered owing to the fact that the tendency of the jaws, when they approach each other in the cutting movement, is to separate or spread apart the individual strands or wires. This renders cutting difficult, as the jaws cannot get the proper grip on at least one of the strands. More specifically, the object of my invention is to overcome this drawback by furnishing a tool in which both or all the strands are positively and firmly gripped by the shearing edges.

To these and other ends the invention consists in the novel features and combinations of parts to be hereinafter described and claimed.

In the accompanying drawings:

Fig. 1 is a side elevation of a tool embodying my improvements, showing the jaws opened.

Fig. 2 is a similar view showing the jaws closed.

Fig. 3 is an enlarged side edge view of the front end portion of the tool.

Fig. 4 is a front end elevation of the tool with the handles omitted, and

Figs. 5, 6 and 7 are fragmentary views of the cutting jaws showing them in different positions.

In its general features, the tool selected for illustration is similar to that shown in my Patent No. 1,164,981, dated December 21, 1915. The jaws 10 are formed at the forward ends of crossed lever members 11, which are pivoted together by a suitable pivot member 12. The levers 11 are operated by handle levers 13, which are pivoted together at their forward ends by means of a pin 14 and are pivoted to the rear ends of the levers 11 by means of pins 15. By pivoting the lever handles 13 together at their forward ends, and pivoting them to the levers 11 in the manner stated, a very powerful compound leverage is obtained, as described in the patent aforesaid.

The jaws 10 are of the shearing type, having shearing edges located closely in front of the pivot 12, for shearing off the wire. The tool is provided with seats or grooves in which the different strands respectively are firmly and positively gripped during the shearing action. The tool selected for illustration is adapted for the shearing of two-strand wire of the kind previously described and consequently two grooves or seats are provided for gripping the two strands, each jaw preferably having two seats or grooves, those of one jaw being in registry with the corresponding seats or grooves of the other jaw. In the form shown, both of the jaws are alike. Each has a flat inner face 10ª which, when the jaws are fully closed, partially overlies the corresponding face of the other jaw. In other words, parts of the inner edges of the jaws are adapted to pass each other when the jaws are fully closed, as shown by the dotted lines in Fig. 7. This overlapping may be accomplished by forming the respective cutting edges of the jaws outwardly off center with respect to the center of the pivot 12, or in other words so constructing the jaws that a line drawn across the cutting edges of the seats or grooves of the bottom jaw will lie below the center of the pivot and a similar line across the upper jaw will lie above the center of the pivot. The overlapping portions of the jaws are located in front of the wire receiving seats, which are preferably constituted by partly cylindrical grooves 16, 17. The inner edge portions of the jaws are relatively wide and flat, the jaws being fairly thick and heavy so as to fulfill satisfactorily the intended purpose.

The shearing edges are, of course, located at the juncture of the inner face 10ª, with the inner ends of the respective grooves 16, 17, a right-angled shearing edge being produced at the inner ends of the seats or grooves.

The grooves 16, which are located farthest in front of the pivot 12, may be somewhat shallower than their companion grooves, which are located nearer the pivot. When the jaws are fully closed, as shown in Fig. 7, the complementary grooves do not form round openings, but rather they form elliptical or flattened openings between the jaws. These openings are shallow as compared to their width, as will be seen from Fig. 7, and the front opening is shallower than the rear opening. The curvature of the grooves corresponds approximately to the periphery of the wire strands, which are of the same diameter, but neither groove is of the cross-sectional area as large as half of the cross-sectional area of the wire strand, the curved shearing edge of each groove being less than a semicircle.

The grooves 16, 17, lie immediately adjacent and parallel to each other in the particular form shown, but this is not essential in all aspects of the invention.

The operation of the tool is as follows:

The jaws being open, the wire is introduced between them as shown in Fig. 5. The jaws are then closed by forcing together the lever handles 13. When the jaws reach approximately the position shown in Fig. 6, the strands are gripped firmly in the respective grooves 16, 17 of both jaws, and as the jaws are moved to the fully closed position, shown in Fig. 7, the wire is forcibly sheared off and severed. Because of the peculiar off center location of the corresponding cutting edges in relation to the pivot the forward portion 18 of one of the jaws meets and passes the corresponding portion of the other jaw before the rear portion does and consequently the wire or wires farthest from the pivot are gripped and sheared first. It is also obvious that there will be a tendency to crowd the wires toward the pivot but due to the confining action of the grooves, no movement takes place. By cutting one strand ahead of the other the operation is considerably facilitated. When the jaws are brought together on the wire, the outer grooves 16 immediately grip the outer strand in a firm and positive manner, thus preventing it from being separated from the inner strand. As the outer strand is firmly gripped, it is not forced or wedged outwardly by the alligator movement of the jaws and hence it is cut very effectively, the cutting action commencing before the cutting action on the inner strand. The shearing action on the wire is so forcible that both strands are torn apart or sheared off by the time the jaws reach the position shown in Fig. 7, in which position shallow openings still exist between the jaws in line with the respective cooperating pairs of grooves.

When the jaws are closed on the wire, the inner edge portions of the former meet and pass each other in front, as well as in the rear of the wire receiving grooves. The portions 18 (Fig. 7) in front of the grooves 16, which extend inward farther than the bottoms of grooves 16, obviously constitute a very effective means for preventing outward slip of the wire immediately prior to and during the cutting.

Without limiting myself to the precise construction shown, I claim—

1. In a hand tool for shearing wire having a plural number of strands, a pair of pivoted operating handles, a pair of pivoted jaws, said operating handles connected to said jaws rearward of the pivot of said jaws, said jaws having a plural number of transverse grooves in the portion forward of the pivot thereof, said grooves arranged to retain the strand of wire nearest the pivot of said jaws while a strand of wire farther away from said pivot is being sheared.

2. A tool for shearing wire having a plural number of strands, provided with pivoted alligator shearing jaws between which the strands are introduced, said jaws being provided with transverse grooves to grip and shear the strands in the inverse order in which they are arranged from the pivot of said jaws.

3. A tool for cutting multiple strand wire, provided with wide opposed shearing jaws pivoted together, said jaws having cutting edges outwardly off center with respect to the pivot center and tending thereby to crowd said wire strands toward the pivot and having transversely extending wire seats at the inner portion thereof to grip and retain said wire during the shearing operation.

4. A tool for cutting a plurality of wires substantially simultaneously, comprising a pair of pivoted handles, a pair of wide jaws pivoted together and to said handles for operation thereby having wire seats extending across same adjacent the pivot, the shearing edges of said seats being outwardly off center with respect to the pivot center, thereby causing said jaws to crowd the wires toward said pivot and retain and support said wires within said jaws in said seats during the shearing operation.

5. A hand tool for cutting wire having a plurality of strands, comprising a pair of operating handles pivoted together, a pair of wide pivoted jaws pivoted to said handles for operation thereby, said jaws having cooperating shearing edges, said jaws also having a plurality of grooves extending at right angles from said shearing edges across said jaws closely adjacent the pivot of said jaws, whereby the jaws respectively grip and shear in the direction of the jaw pivot the strands of wire in said grooves.

6. A tool of the class described equipped with pivoted jaws having shearing edges that pass each other and wire carrying grooves extending across the jaws at right angles to said shearing edges, said shearing edges located with respect to the pivot of said jaws so that the grooves nearest the pivot will grip and hold a strand of a stranded wire placed therein while the other strand or strands are being sheared and will then shear the first strand.

In witness whereof, I have hereunto set my hand on the 27th day of November, 1918.

WILLIAM A. BERNARD.